United States Patent [19]
Nilsson et al.

[11] Patent Number: 5,838,487
[45] Date of Patent: Nov. 17, 1998

[54] OPTICAL AMPLIFIERS

[75] Inventors: Lars Johan Albinsson Nilsson, Karlskoga, Sweden; Yong-Woo Lee, Kyungki-do, Rep. of Korea

[73] Assignee: SamSung Electronics Co., Ltd., Suwon, Rep. of Korea

[21] Appl. No.: 692,205

[22] Filed: Aug. 5, 1996

[30] Foreign Application Priority Data

Aug. 5, 1995 [KR] Rep. of Korea ................. 1995/24248

[51] Int. Cl.$^6$ .............................. G02F 1/35; H01S 3/06
[52] U.S. Cl. ........................ 359/341; 359/133; 359/174
[58] Field of Search ................................. 359/133, 134, 359/160, 174, 341

[56] References Cited

U.S. PATENT DOCUMENTS

| 5,058,976 | 10/1991 | DiGiovanni et al. | 359/341 |
|---|---|---|---|
| 5,406,404 | 4/1995 | DiGiovanni et al. | 359/160 |
| 5,436,760 | 7/1995 | Nafayashi | 359/341 |
| 5,526,175 | 6/1996 | Minelly et al. | 359/341 |
| 5,530,584 | 6/1996 | Myslinski et al. | 359/341 |
| 5,557,442 | 9/1996 | Huber | 359/160 |
| 5,657,153 | 8/1997 | Endriz et al. | 359/341 |

FOREIGN PATENT DOCUMENTS

| 0566236 | 10/1993 | European Pat. Off. . |
|---|---|---|
| 6276154 | 3/1994 | Japan . |
| 2304229 | 3/1997 | United Kingdom . |

OTHER PUBLICATIONS

Lee et al, IEEE Photonics Technology Letters, vol. 8, #12, 1612–14, Dec. 1996.
Nilsson et al, IEEE Photonics Technology Letters, vol. 8, #4, Apr. 1996 (pp. 515–517).
Giles et al, IEEE Photonics Tech. Letters, vol. 2, #12, Dec. 1990, pp. 866–868; Abstr. Only Herewith.
Bogatyrjov et al, Elect. Letters, vol. 31, #1, pp. 61–62, Jan. 5, 1995; Abstr. Only Herewith.
Betts et al, Photonic Technologies, OFC '95, vol. 8, pp. 80–81, Mar. 3, 1995; Abst. Only Herewith.
Nilsson et al, Elect. Letters, vol. 31, #18, pp. 1578–1579, Aug. 31, 1995; Abst. Only Herewith.
Kashiwada et al, OFC'95, vol. 8, pp. 77–78, Mar. 3, 1995; Abst. Only Herewith.

*Primary Examiner*—Nelson Moskowitz
*Attorney, Agent, or Firm*—Robert E. Bushnell, Esq.

[57] ABSTRACT

An erbium doped fiber amplifier has a shape of the gain spectrum which is independent of the operating conditions by using a gain medium with this property. The gain medium can be an erbium-doped fiber with a wavelength-independent gain swing over a range of wavelengths (especially a low $Al^{3+}$-content aluminogermanosilicate EDF). As an alternative, the gain medium can consist of at least two pieces of EDFs, so that changes of the shape of the gain spectra (induced by changes of the operating conditions) in the different types of EDFs effectively offset each other. Within an overlapping wavelength range, the gain spectrum can then be further modified in a power-independent way (i.e.—independent of operating conditions) so as to make the gain spectrum flat (i.e.—gain wavelength-independent) by means of one or several optical filter(s) placed before and/or after the gain medium, and/or distributed along the gain medium, or by means of a "filtering EDF", specially selected in a constant population inversion region of the EDFA. The gain spectrum thus obtained is both flat and independent of operating conditions so that a dynamic gain flatness which is independent of input signal power, operating gain, and population inversion is realized. As a desired consequence of the dynamic gain flatness, the gain of different channels in a WDM system will always be equal, irrespective of the operating conditions. Furthermore, AC gain tilt will be eliminated for analog AM CATV systems.

91 Claims, 13 Drawing Sheets

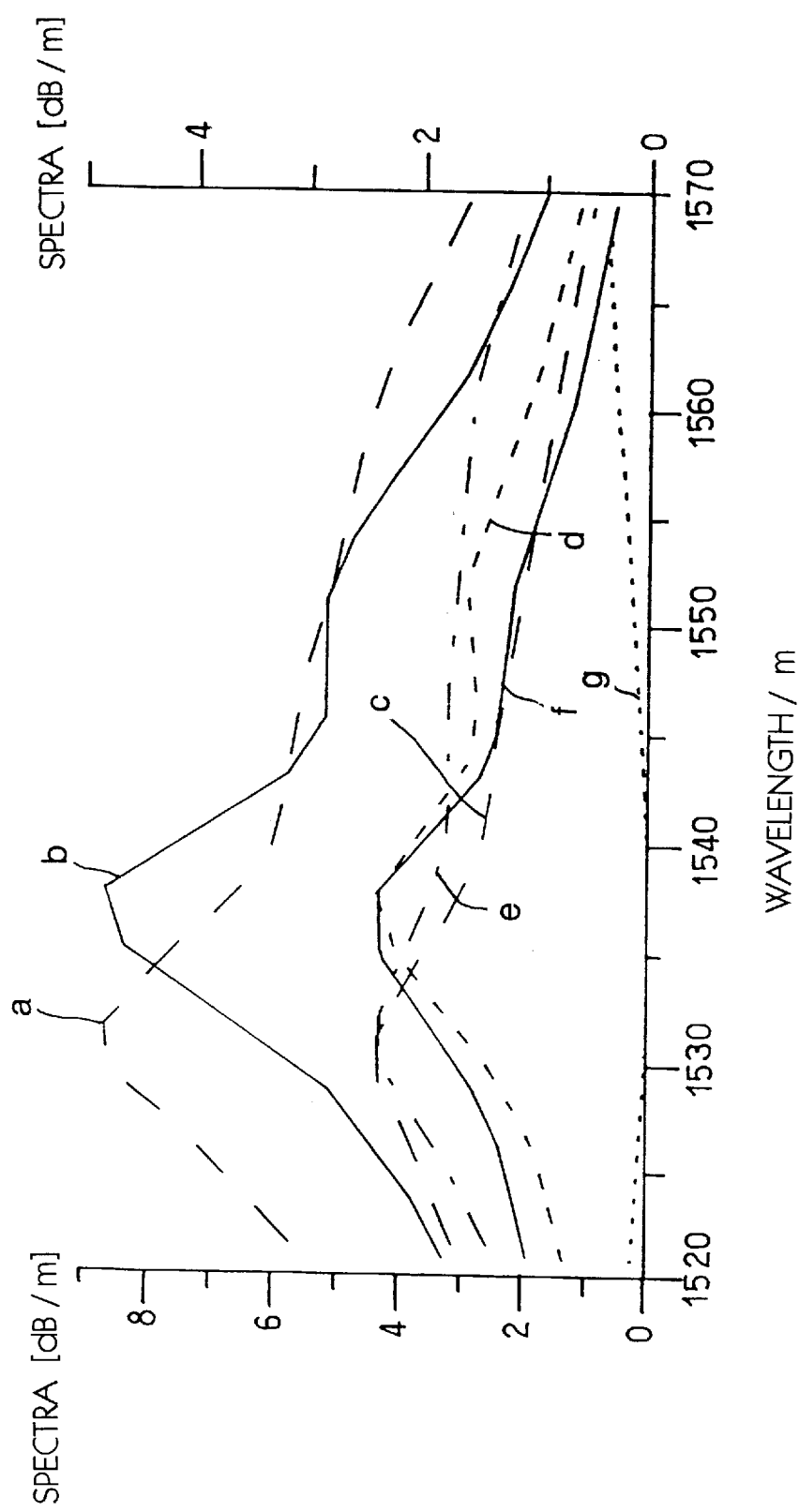

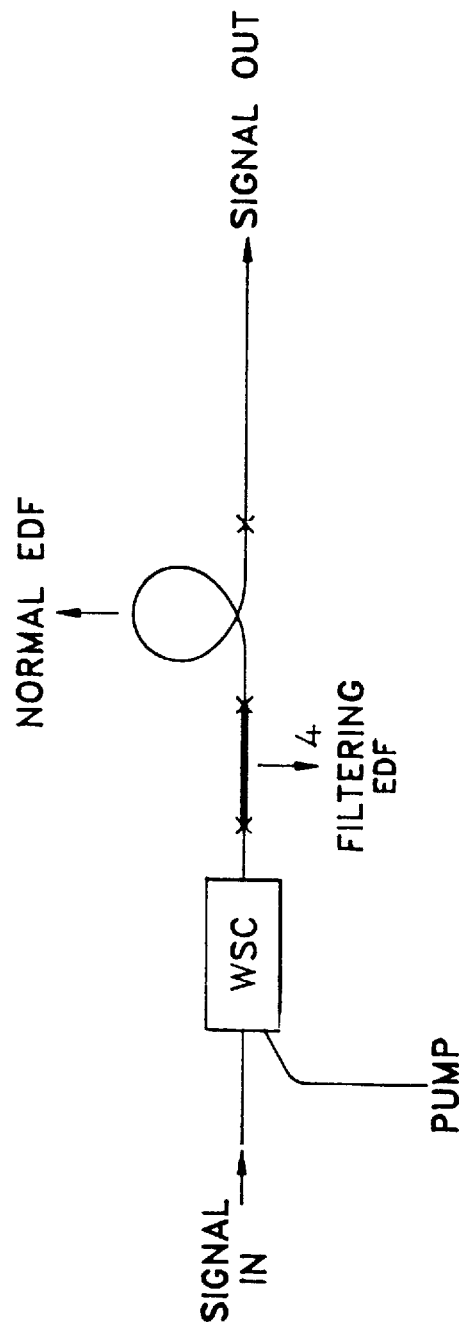
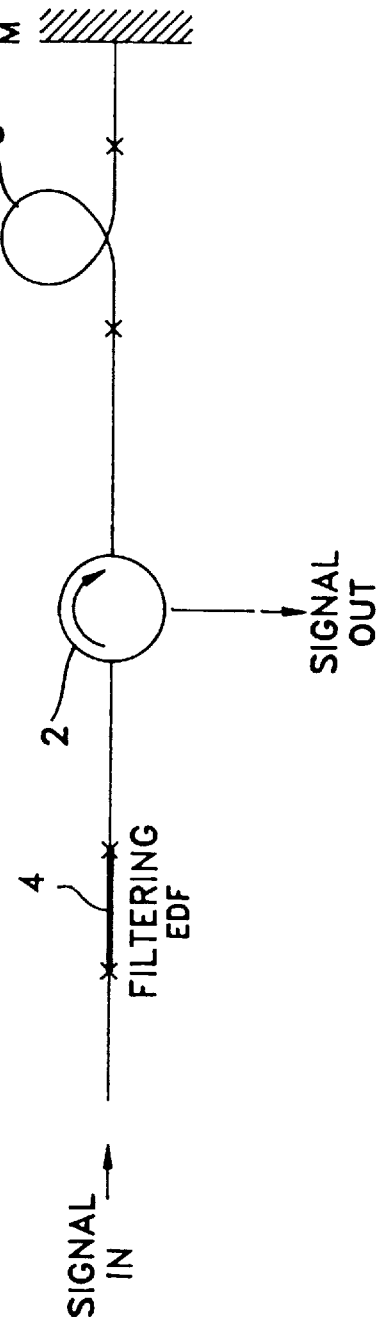

OPTICAL AMPLIFIERS

CLAIM OF PRIORITY

This application make reference to, incorporates the same herein, and claims all benefits accruing under 35 U.S.C §119 from an application entitled Optical Amplifiers earlier filed in the Korean Industrial Property Office on 5 Aug. 1995 and assigned Ser. No. 24248/1995.

BACKGROUND OF THE INVENTION

1. Technical Field

The present invention relates to optical amplifiers and is concerned particularly but not exclusively with erbium doped fiber amplifiers (EDFA) and various applications thereof 2. Background Art Erbium doped fiber amplifiers (EDFAs) are predicted to be widely employed in future telecommunications systems, and are even used in systems being installed currently. They will allow for greater data rates being transferred over greater distances in a single optical fiber without regeneration. However, some new problems arise with the high data rates and/or long distances. Wavelength division multiplexing (WDM) represents a method of overcoming some of those problems.

Unfortunately, EDFAs used in WDM systems have the undesirable feature that the gain is normally different for different channels (wavelengths). This can be characterized by the locked inversion (LI) gain spectrum, which is measured at a constant population inversion. A further difficulty arises in that if the population inversion of an EDFA changes, the gains at different wavelengths will change by different amounts. Therefore, the gain flatness of an EDFA depends on the operating gain, which consequently has to be considered in the EDFA design. However, the gain depends on, e.g., the signal and pump powers and spectral distributions, which both may vary. Furthermore, for cascaded amplifiers with many EDFAs, the average gain approximately equals the average loss between amplifiers, which also may be unknown and even time-varying. Moreover, in some applications, one may want to utilize the inherent automatic power control of EDFAs, which exclusively relies on a change of the gain level in the EDFA. Clearly then, it can be difficult or even impossible to know for what gain level a gain-flattened EDFA should be designed.

A plurality of methods have been used for obtaining a flat LI gain spectrum, with various degrees of complexity and applicability. One useful method is to modify the composition of a glass used in the EDFA. The glass composition modifying process has so far been focused on obtaining a flat gain. The dependence of the shape of the gain spectrum on the population inversion can be used to fine-tune an LI gain curve by choosing an optimum population inversion. Often, high $Al^{3+}$-content $Er^{3+}:Al^{3+}:Ge^{4+}:SiO_2$ glasses are used for fabricating an EDFA with gain flatness. Similarly, fluoride glass is used for fabricating an EDFA with a wide flat gain. Another solution is to use a gain-flattening filter. According to a recent review of optical amplifiers for WDM, an EDFA according to conventional technology may have the following problems.

1. The EDFA completely ignores LI gain flatness. (And, the LI gain flatness is insufficient.)
2. The EDFA is flattened only for a certain input signal and pump powers.
3. The EDFA is flattened only for a certain gain.
4. The EDFA requires equalization with a tunable filter, or at least input power adjustment with a variable attenuator.

Hence, the following complications typically arise in EDFAs for WDM.

1. The LI gain curve shape, including flatness, will change if operating conditions change.
2. If at least one or more of the pump sources fail, the LI gain shape will change drastically.
3. A conventional EDFA needs to operate at a predetermined gain.
4. A conventional EDFA needs to monitor signal power, and control either an adjustable spectral filter or attenuator or the pumping of the EDFA.
5. A conventional EDFA needs an adjustable filter.
6. A conventional EDFA cannot provide automatic power control, which normally is an inherent characteristic feature of the EDFA, since if it did, the shape of the gain spectrum would change.

SUMMARY OF THE INVENTION

Preferred embodiments of the present invention aim to overcome the above problems and to provide an erbium doped fiber amplifier of which the spectral shape of an LI gain curve is independent of the operating gain, as influenced by, e.g., input signal power, over at least a part of the gain spectrum.

Another aim is to provide an erbium doped fiber amplifier of which the spectral shape of an LI gain is independent of operating gain and population inversion and dynamic gain flatness is obtained by making the LI gain flat in an overlapping wavelength range.

According the one aspect of the present invention, there is provided an optical amplifier comprising a gain medium having a gain characteristic in which, if the gain changes at one wavelength, the gain at another wavelength will change by substantially the same amount.

The gain characteristic may be such that, if the gain changes at one wavelength, the gain will change by substantially the same amount at all wavelengths in a continuous wavelength range.

The gain characteristic may be such that, if the gain changes at one wavelength, the gain will change by substantially the same amount at each of a plurality of discrete wavelengths in a wavelength range.

The gain may be a homogeneously broadened gain medium.

Preferably, the gain medium comprises an optical fiber.

Preferably, the optical fiber comprises an erbium doped fiber.

Preferably, the optical fiber comprises an erbium doped alumino-germanosilicate fiber containing up to 10% aluminum.

Preferably, the aluminum content is about 1%.

The transverse disposition of the gain medium may be modified to provide the gain characteristic.

The gain medium may be a hybrid gain medium obtained by combining pieces of at least two different gain media, the lengths and positions of the different gain media being adjusted to provide the gain characteristic.

A pump wavelength may be adjusted in order to minimize any dependence of the LI gain shape on the gain level in a predetermined wavelength range.

An optical fiber amplifier as above may further include a reflecting mirror and optical branchoff means such that a light signal passes twice through the gain medium before and after reflection at the mirror in order to pass through the gain medium twice, thereby enhancing uniformity of signal-induced gain compression, and the reflected signal is thereafter branched off and output.

An optical amplifier as above may include a filter for modifying the gain spectrum in the gain medium to achieve a substantially equal gain at the different wavelengths.

A desired modification of the spectrum (filtering) may be obtained in a predetermined wavelength band by the additional use of one piece of gain medium with desired spectral characteristics in a part of the amplifier where the gain does not saturate or, alternatively, the amount of gain saturation does not change, over the range of operating conditions for which the amplifier is designed.

Filtering in the one piece of gain medium may be adjusted by changing a pump wavelength.

The invention extends to an optical transmission system including at least one optical link and at least one optical amplifier according to any of the preceding aspects of the invention.

In such an optical transmission system, wherein the system has losses which change in a predicted wavelength-dependent manner over a time period, the gain characteristic of the gain medium may be adapted to change in a predetermined wavelength-dependent manner over the period to compensate for said change in said losses, so that the wavelength dependence of the net gain remains substantially independent of the loss changes.

The term "net gain" means the gain of the system minus the losses of the system.

An optical transmission system as above may include at least one filter associated with a plurality of optical amplifiers, the filter being incorporated in one of the optical amplifiers or disposed between two of the optical amplifiers.

In an optical transmission system as above, wavelength-division multiplexed (WDM) signals may be amplified in at least part of the system.

An optical transmission system as above may provide an AM CATV fiber-optical distribution link or network.

BRIEF DESCRIPTION OF THE INVENTION

The above objects and advantages of the present invention will become more apparent by describing in detail a preferred embodiment thereof with reference to the attached drawings in which:

FIG. 2 is a graph for illustrating spectra relative to low $Al^{3+}$ comparison with spectra relative to conventional high $Al^{3+}$ content EDFs;

FIG. 10A illustrates one example of an EDFA with pre-filtering EDF;

FIG. 10B illustrates one example of a reflection type EDFA with pre-filtering EDF.

DETAILED DESCRIPTION OF THE INVENTION

Figure 1A:
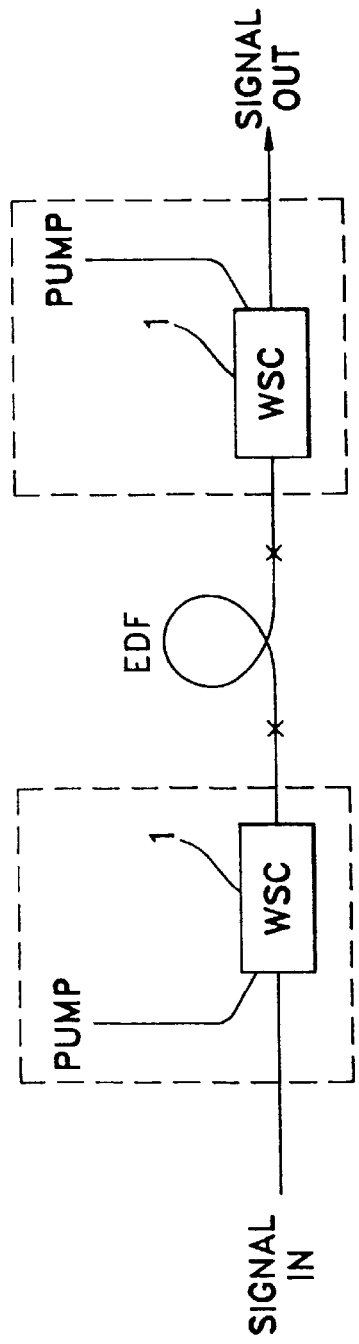
FIG. 1A shows one example of a conventional EDFA with a general pumping structure.

FIG. 1A shows one example of a conventional EDFA with a general pumping structure. In this and other figures, optical fibers are denoted by lines, and fiber joints (typically splices) are denoted by crosses. The EDFA shown in FIG. IA includes an erbium doped fiber (EDF), two pump lasers and two wavelength selective couplers (WSCs) I and the pumping structure thereof is bi-directional. The pumping structure may also be uni-directional, i.e., forwardly or backwardly. The WSC(s) allow(s) for an optical pump beam to be launched into the path of the transmitted signal (and hence into the EDF). In the EDF, power is transferred from the optical pump(s) to the optical signal, whereby the signal is amplified. In the case of WDM, a multitude of signals (channels) are transmitted by a multitude of signal beams, each at a different (albeit similar) wavelength.

Figure 1B:
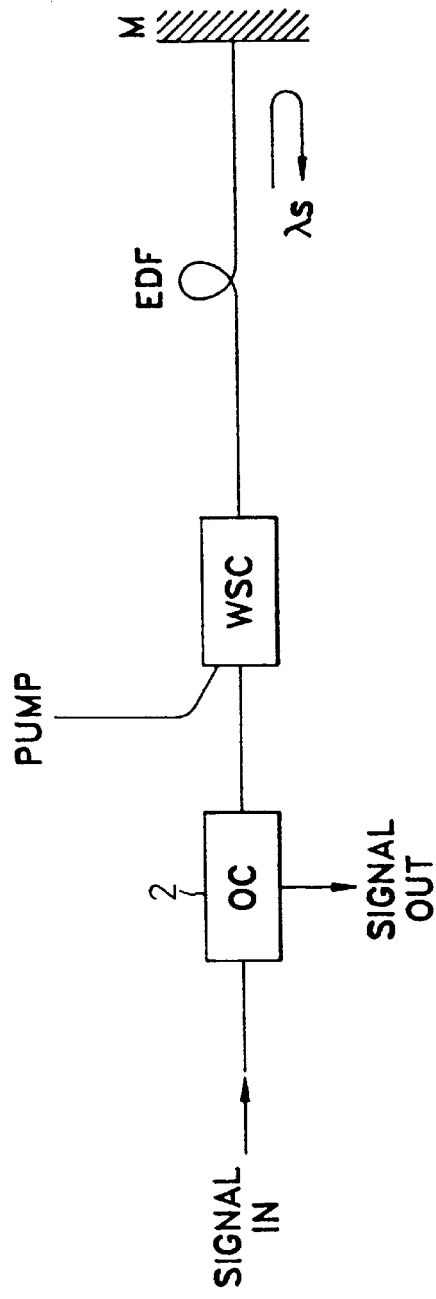
FIG. 1B shows one example of a general reflective type EDFA.

FIG. 1B shows one example of a general reflective type EDFA. The reflective type EDFA includes the EDF, WSC 1, the pump laser, a mirror (M) for reflection and an optical circulator (OC) 2. Here, the OC 2 is for branching off output light amplified by reflection in the EDF.

Examples of erbium doped optical fiber amplifiers (EDFA) embodying the present invention are described below.

The shape of a change in LI gain spectrum (in dB) for a homogeneously broadened gain medium may be given by the gain swing (per unit length) $g_{p-p}(\gamma)\equiv[g^*(\gamma)+\alpha(\gamma)]$ (in decibels per meter), where $g^*(\gamma)$ is the gain and $a(\gamma)$ is the absorption spectrum. Where the gain of EDFAs is predominantly homogeneously broadened, this equation can be expected to well describe an EDFA, as has been experimentally demonstrated. However, this and other equations only serve to explain the principles of preferred embodiments of the invention. The invention, more generally, does not necessarily rely on the validity of the equations. In any case, the equations can be expected to be only approximately valid. Hence, it is proposed to use an erbium doped optical fiber (EDF) with a constant gain swing over some wavelength range, or equal gain swing at a discrete set of wavelengths. Obviously, then, as the gain becomes compressed, an EDFA with a minimum variation f of the shape of the gain spectrum is obtained or in the case of equal gain swing at discrete wavelengths, the gain change at these wavelengths will be equal.

A first type of gain medium is a normal EDF with a constant gain swing. However, in order to obtain the EDF, the composition and manufacturing process thereof should be carefully controlled. Low $Al^{3+}$ content aluminogermanosilicate glass having a constant gain swing is a first type of gain medium for an EDFA. A second type of gain medium consists of a hybrid EDFA, spliced together from at least two different types of EDFs. Here, the changes in the shape of the gain spectra in the different EDFs cancel each other to effectively create a flat gain swing. In this case, careful attention has to be paid to how long different pieces of EDFs are, and in which order they are put together. Additional advantages can be gained by carefully adjusting the pump wavelength.

While a gain medium according to the above assures that the spectral gain shape will be independent of operating condition, it is unlikely to be flat. To make the gain flat, some modifications are likely to be needed. One possibility is to insert a linear (i.e., power independent) filter, providing a spectrally dependent attenuation, before, after, or inside the gain medium.

Another possibility for effective filtering is to obtain the same effect as that of the linear filter by using a specially selected EDF in a constant-inversion region of the EDFA. At this time, the inversion should be independent of the signal wavelength and power variations. In an EDFA with a forwardly propagating pump, such regions can be found in the initial part of the EDFA, since the signal power, and hence its variations, will be small enough to not influence the population inversion in that part of the EDFA, for many practical systems. The spectral gain difference between this EDF and the one which would otherwise be used (if any) is carefully tailored to flatten the gain.

It has been discovered that it is indeed possible to make EDFAs where the spectral shape of the LI gain will be independent of the input signal power, pump power and operating gain. New EDFAs may be similar in many respects to existing models, except that the gain medium (EDF) is specially designed to have some special properties. Furthermore, special attention is placed on the pumping in some versions of the gain medium. In preferred embodiments, a new EDFA is much improved with respect to the previously mentioned drawbacks.

One property of a new EDFA is that the spectral shape of the LI gain will be independent of the operating gain and population inversion. A further option is to make the LI gain flat in a wavelength range overlapping with the constant shape range. Then, dynamic gain flatness (DGF) is obtained.

For this purpose, either a spectral filter or further modification of the design of the gain medium can be used. Then, the gain will be flat and stay flat as the operating level of the gain changes. It will also eliminate AC gain tilt and tilt variations in EDFAs for analog AM CATV.

FIGs. 1A and 1B show some possible configurations for an EDFA. FIG. 1A shows an EDFA with possible unidirectional (forward and backward) or bi-directional pumping. FIG. 1B shows an example of a reflective EDFA with a circulator.

Based on the conventional EDFA shown in FIGs. 1A and 1B, an example of an EDFA according to the present invention is described below in more detail.

First, let us consider that the EDFA consists of a single type of EDF. Then, for a homogeneously broadened gain medium like the EDF, the LI gain G (in dB) can be written as $$G(n_2,\gamma)=[g^*(\gamma)n_2-\alpha(\gamma)(1-n_2)]L-f(\gamma) \qquad (1)$$

where $\gamma$ is the wavelength, L is the distance that the signal propagates through the EDF, $\alpha(\gamma)$ is the absorption spectrum in decibels per meter, $g^*(\gamma)$ is the gain, in decibels per meter, at complete inversion, $f(\gamma)$ is the attenuation of an optical fiber in decibels, and $n_2$ is the degree of excitation averaged over the EDFA, i.e. the ratio of $Er^{3+}$-ions. $n_2$ is directly related to the population inversion. Note that the quantity $n_2$ suffices for the description of how the gain varies because of changing operating conditions. According to equation (1), the LI gain spectrum changes with $n_2$ as:

$$\partial G(n_2,\gamma)/\partial n_2 = L[g^*(\gamma)+\alpha(\gamma)] \qquad (2)$$

If the quantity $[g^*(\gamma)+\alpha(\gamma)]\equiv g_{p-p}(\gamma)$ is equal for two wavelengths, the gain (in dB) at these wavelengths will change by equal amounts as $n_2$ changes. The product $Lg_{p-p}(\gamma)$ also equals the gain difference between a completely inverted and an un-pumped EDFA, i.e., the maximum total gain swing (change) of the EDFA. A key aspect of preferred embodiments of the present invention is that for the design of a DGF EDFA, $g_{p-p}(\gamma)$ must be constant over an extended wavelength range. It has been found that this can be achieved in an $Er^{3+}$:$Al^{3+}$:$Ge^{4+}$:$SiO_2$ glass fiber around wavelengths of 1.55 μm. Such an EDF can be fabricated by standard methods (in this case, MCVD together with solution doping).

Equations 1 and 2 are also applicable for a four-level system. In contrast to this, the EDF is a two- or three-level system, depending upon the pump level. For a four-level system, $\alpha(\gamma)$ equals zero for the signal wavelengths.

Hence, provided that also the loss $f(\gamma)$ is negligible, the gain swing will be wavelength-independent if and only if the gain is also wavelength-independent. In contrast to the EDFA gain flatness, one can therefore solve both the problem of a wavelength-independent gain and a wavelength-independent gain swing at the same time by modifying the chemical composition of the gain medium. Therefore, a gain which is wavelength-independent, even as the operating conditions change, will be much more easily obtained-since, in other words, the problem of a gain shape independent of operating conditions is solved at the same time as one obtains a wavelength-independent gain.

For an EDFA, however, those problems are not solved simultaneously. So far, people have tried to obtain flat gain by modifying the EDF's composition, but then the problem with the changing gain shape has remained.

In order to flatten the gain of a gain medium for which the gain spectrum changes with the level of the operating gain, complex monitor and control mechanisms are required, and the fact that the gain is intrinsically flat (even without any filter) is then not of much benefit. If we instead use a gain medium with a shape of the gain spectrum that is independent of the operating gain level, level-independent gain-flatness will be easier to achieve.

FIG. 2 shows the relevant spectra for a low $Al^{3+}$-content $Er^{3+}:Al^{3+}:Ge^{4+}:SiO_2$ glass fiber, e.g. SE 4B401, typically used for gain flattening today (prior art), also fabricated with solution doping. An EDFA made from that fiber exhibited relatively flat gain over a comparatively large wavelength range from 1540 nm to 1565 nm even without a filter. Here, the curves a, c and e are spectra drawn based on the standards of the left coordinate axis and represent $g_{p-p}(\gamma)$, $\alpha(\gamma)$ and $g^*(\gamma)$, respectively, in the case of using the conventional EDF. The curves b, d, f and g are spectra drawn based on the standards of the right coordinate axis and represent $g_{p-p}(\gamma)$, $g^*(\gamma)$, $\alpha(\gamma)$, and $f(\gamma)$ of the new EDFA, respectively.

Figure 3A:
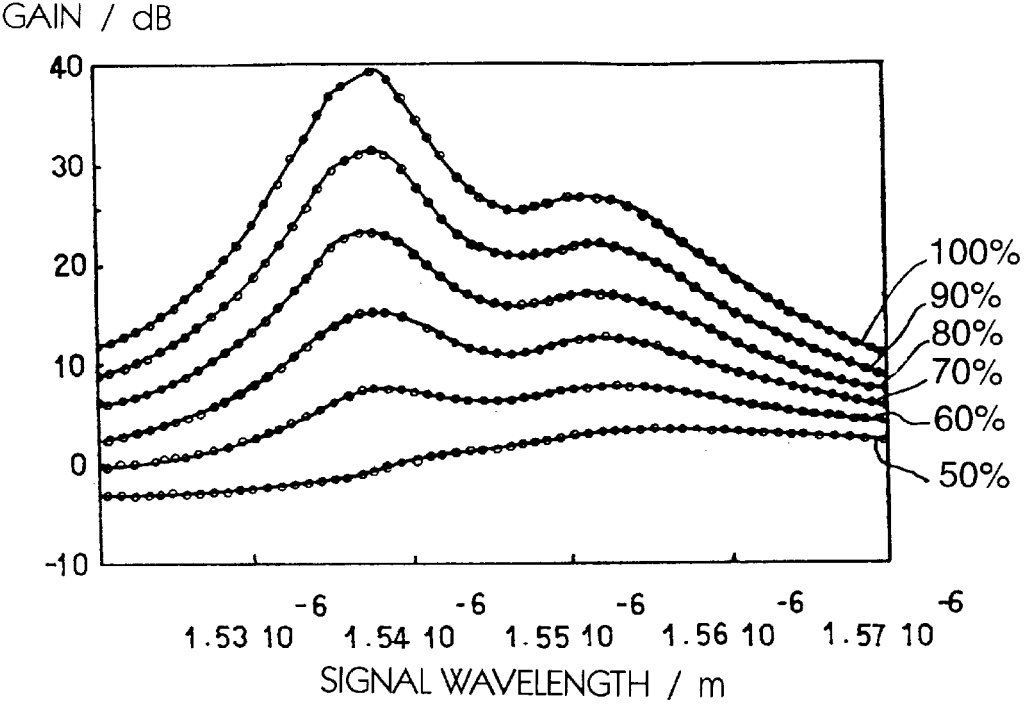
FIG. 3A is a graph for illustrating locked inversion gain spectra, calculated when the operating condition changes, of low $Al^{3+}$ content EDFs according to examples of the present invention, without a filter.
Figure 3B:
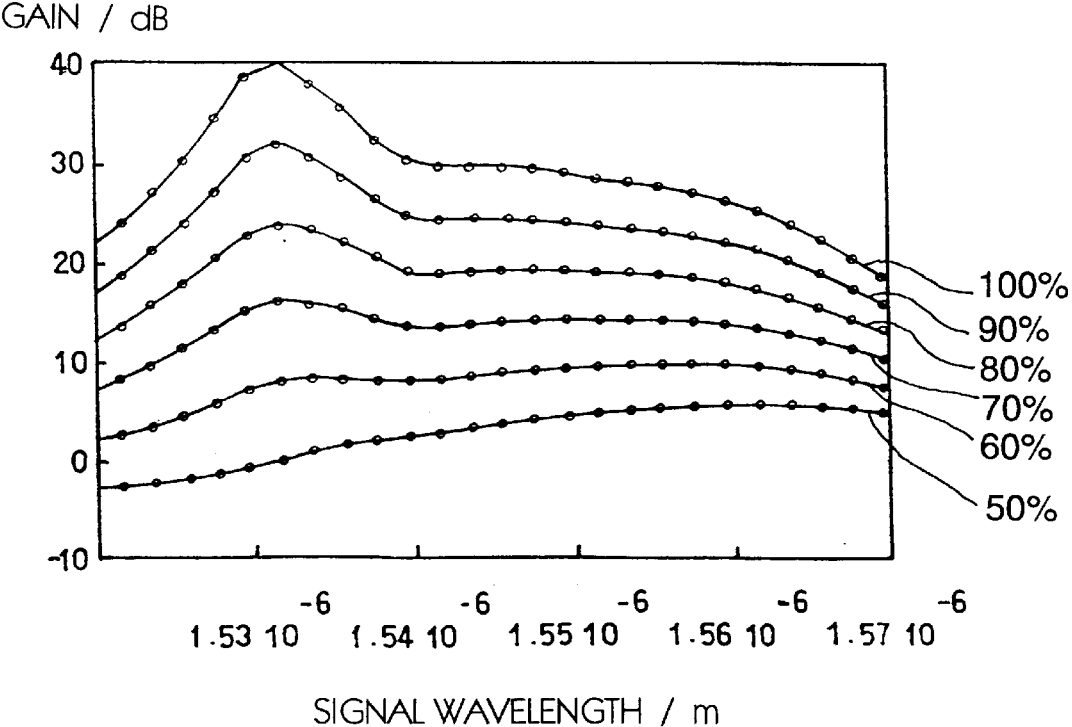
FIG. 3B is a graph for illustrating LI gain spectra calculated when the operating condition changes, of a conventional high $Al^{3+}$ content EDFA without a filter.

FIGS. 3A and 3B show the gain spectra calculated according to equation (1) for the new low $Al^{3+}$ content EDF (e.g. EXR9325) and the EDF (e.g. SE 4B401) of the prior art, for various values of $n_2$. In the figures, a value of, for example, 80% corresponds of a value of $n_2$=0.8. In fabricating the EDFA for obtaining DGF, it is understood that the shape of the gain is independent of the value of $n_2$ in a wavelength range 1545 nm to 1552. This corresponds to the range of constant gain swing in FIG. 2. For the other EDF, there is no such range.

Figure 4:
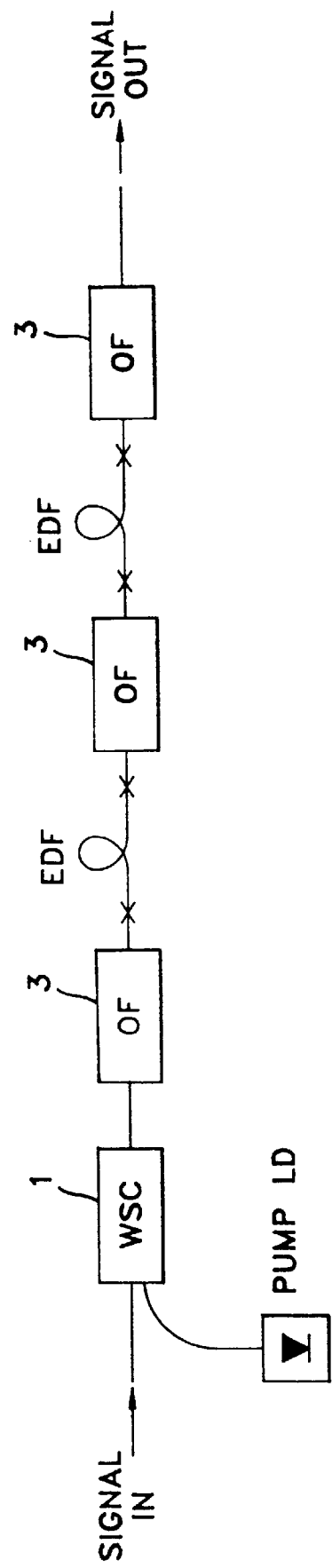
FIG. 4 illustrates one example of an EDFA with a general filter.
Figure 5A:
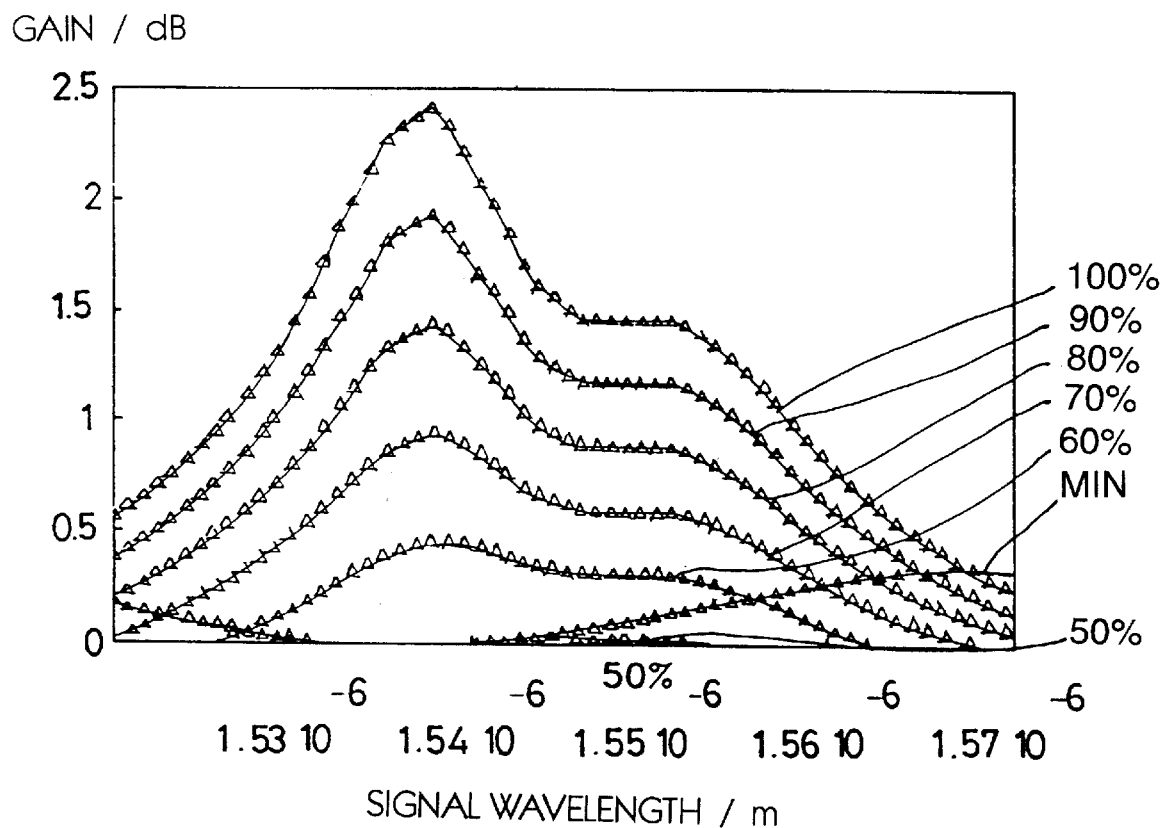
FIG. 5A is a graph for illustrating LI gain spectra calculated when the operating condition changes, of a low $Al^{3+}$ content EDFA with filter (with compensation by filter), according to one example of the present invention.

While the inversion-independent gain shape can be beneficial for e.g. AM CATV, since the constant gain tilt allows for its easy compensation, wavelength division multiplexing (WDM) applications will work better if the LI gain spectrum is flat. A filter (OF) 3 for compensating for the constant gain tilt can be inserted before, between, or after the EDF or EDFs, as shown in FIG. 4. The filtering can also be distributed along the fiber (EDF). Even though the position of the filter 3 will greatly influence the characteristics of the EDFA, it is irrelevant to how the gain spectrum depends on $n_2$. The gain spectrum of the new EDF, with compensation with a filter, is shown in FIG. 5A, for different values of $n_2$. In this example (FIG. 5A), a Mach-Zehnder filter with a maximum attenuation at 1570 nm, free spectral range of 68 nm, zero insertion loss, and peak attenuation of 0.373 dB per meter of EDF was used to flatten the gain. The curve marked "MIN" in FIG. 5A shows the loss of the Mach-Zehnder filter.

Figure 5B:
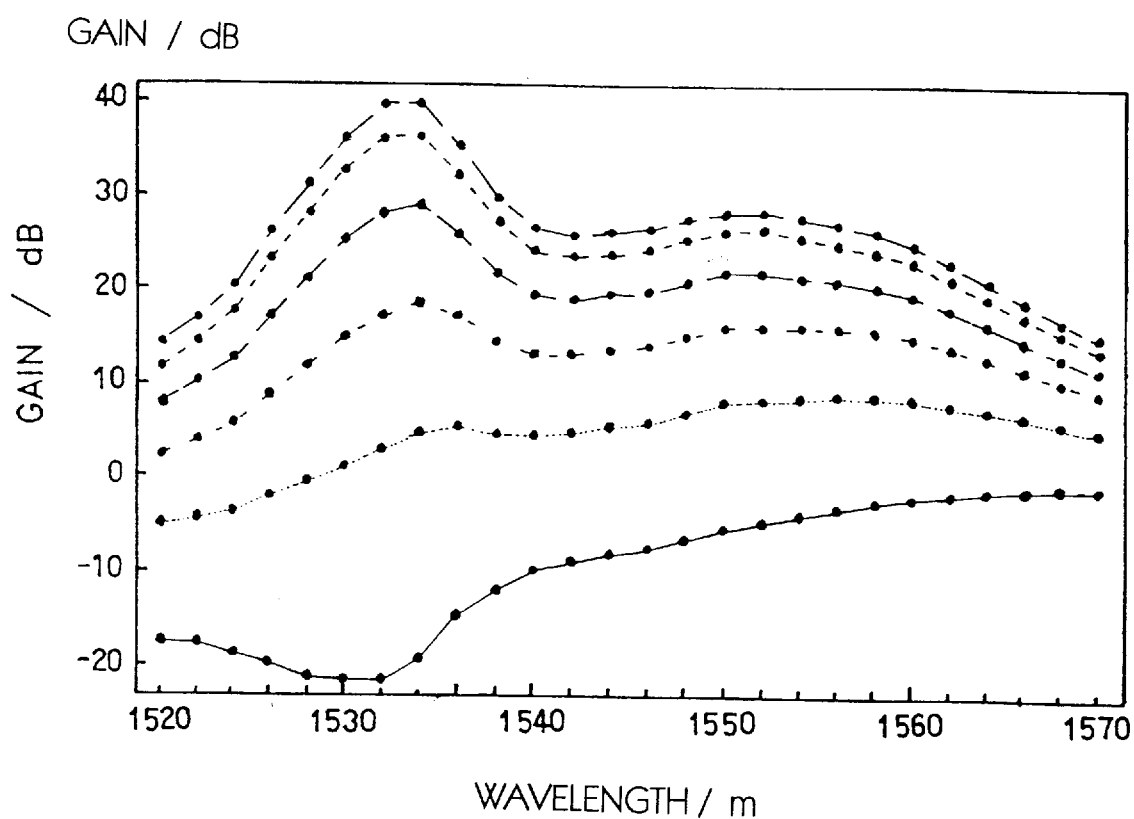
FIG. 5B is a graph for illustrating LI gain spectra measured when the operating condition changes, of an EDFA without a filter (without compensation by a filter) (like FIG. 3A)

While FIGS. 3A, 3B and 5A are calculations based on the measured spectra shown in FIG. 2, FIG. 5B shows an actual measurement of the LI gain of an EDFA with a constant spectral shape in the wavelength region 1542–1550 nm. In this case, the different curves were measured at different pump powers. This is an experimental verification of a constant gain shape EDFA.

Figure 6:
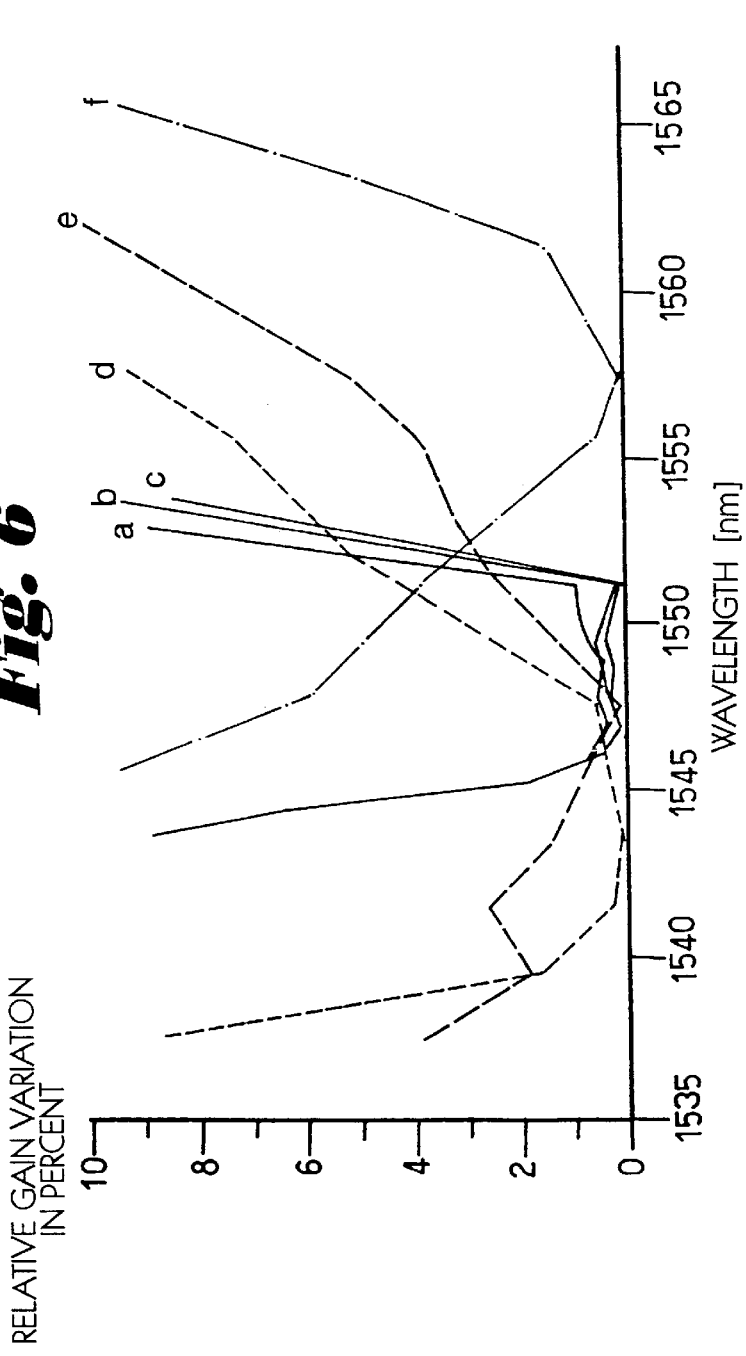
FIG. 6 is a graph for illustrating calculated gain flatness of an EDFA with dynamic gain flatness and of conventional EDFAs.

In order to further analyze the DGF obtained with the special EDF and the filter, and compare it to previous art, the gain deviation is shown for different values of $n_2$ in FIG. 6 for EDFAs based on the two different EDFs. The curves a, b and c show the relative deviations of the gain for EGF EDFA at $n_2$ equal to 0.6, 0.8 and 1.0, respectively. The three curves for different $n_2$ are almost coincident. Here, the maximum gains for $\gamma$>1.540 μm and deviations were calculated for the conventional EDFA and $\gamma$>1.545 μm were used as reference values from which the deviations were calculated for the conventional EDFA and DGF EDFA respectively. The curves d, e and f show the relative deviations of the gain for the conventional EDF at $n_2$ equal to 1.0, 0.8 and 0.6, respectively. The gain was calculated with equation (1).

The following can be seen from FIG. 6. The reference EDFA exhibits a flat gain (to within 3%) over a wide bandwidth for all three different values of $n_2$ used. At $n_2$=0.8, the wavelength range is from 1538 nm to 1554 nm. Thus, for an EDFA with 30 dB gain, a flatness of ±0.45 dB can be obtained in this range. For a cascade of EDFAs with a total gain of 100 dB and with $n_2$ ≈ 0.8, (averaged over all EDFAs), the same wavelength range represents the 3 dB bandwidth. However, the wavelength range changes with $n_2$: at $n_2$=0.6, it is 1552 nm to 1563 nm. The overlap with the wavelength range at $n_2$=0.8 is only 1 nm–2 nm. For the DGF EDFA, the curves for different $n_2$ are close to each other, and the bandwidth is smaller. However, the range of flat gain wavelengths that overlap is relatively large, e.g. 10 nm at 10% flatness and 7 nm at 3% flatness, even as $n_2$ changes from 1 to 0.6. This is a new and unexpected result.

The DGF EDFA corresponding to FIGS. 5A and 6 was only flattened over a limited wavelength range. However, it is also possible to flatten the DGF EDFA over a wider wavelength range, although DGF will only occur in the original wavelength region. As an example, we have found that a simple Mach-Zehnder filter, similar to the one shown in FIG. 5A, can flatten the gain from 1542 nm to 1562 nm. Thus, a wider flat gain, with a bandwidth similar to that of traditional gain-flattened EDFAs, can be achieved without further complicating the EDFA.

The narrow bandwidth of the DGF EDFA is a limitation. Other host materials may provide a constant $g_{p-p}(\gamma)$ over a larger bandwidth. furthermore, the spectral shapes can also be modified by changing the geometries of the refractive index and the $Er^{3+}$-doping of the EDF.

Figure 7:
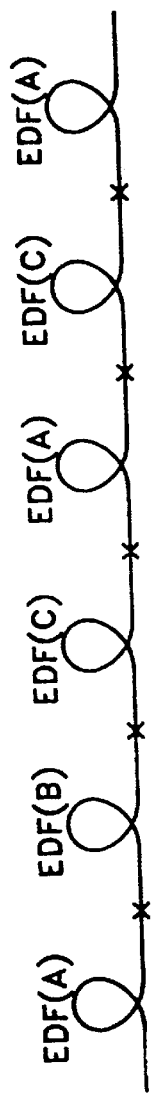
FIG. 7 shows one example of a hybrid EDFA.

While the DGF EDFA described above results in a flat gain over a wide range of operating conditions, there is one distinct drawback: it may be difficult to accurately control the gain swing of the EDF during manufacturing. A way around that would be to use at least two different EDFs (A, B and C) with different shapes of the gain swing, spliced together to a hybrid EDF, as shown in FIG. 7, with an effectively flat gain swing. Now, the gain is given by $$G(\lambda, n_{2,1}, n_{2,2}, \ldots n_{2,i}, \ldots, n_{2,k}) = \quad (3)$$
$$\sum_{i=1}^{k} [g_i^*(\lambda)n_{2,i} - \alpha_i(\lambda)(1 - n_{2,i})]L_i - f(\lambda)$$

where k is the number of different types of EDFs, $\gamma$ is the wavelength, $L_i$ is the fiber length of EDF type I, $\alpha_i(\gamma)$ is the absorption spectrum in decibels per meter of EDF, $f(\gamma)$ is the attenuation of an optical filter and/or background losses, etc., in decibels, and $n_{2,i}$, is the degree of excitation, i.e. the ratio of $Er^{3+}$-ions in the excited (metastable) state to the total number of $Er^{3+}$-ions EDF type I. (Note that now, one must distinguish between $n_2$ in the different types of EDF.)

However, to make the hybrid EDFA efficient for DGF, several design modifications are needed compared to current hybrid EDFAs (prior art).

Figure 8:
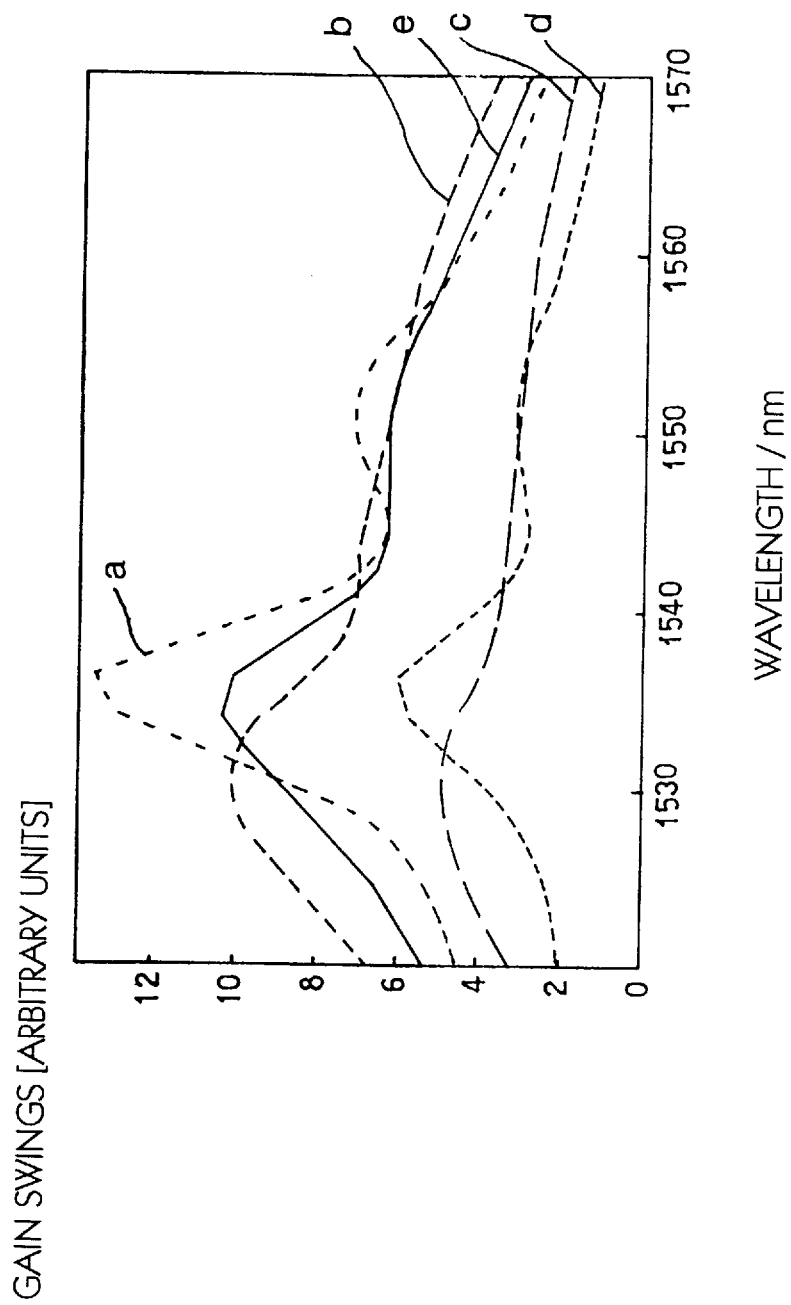
FIG. 8 is a graph for illustrating gain swings of the two different types of EDFs in a hybrid EDFA, together with the weighted sum of the gain swings.

First of all, the EDFs and their lengths must be chosen so that the weighted sum of their gain swings will be constant over a wavelength region. The sum is weighted by the length of the individual pieces of EDFs where the gain can be compressed, and the maximum amount of compression that the different EDFs can experience, i.e. the maximum amount that $n_{2,i}$ can vary during compression. In general, that is given by the difference between the maximum value of $n_{2,i}$, which is upwardly limited by $g_i^*(\gamma p)/g_{p-p,i}(\gamma p)$ and limited downwards by $\alpha_i(\gamma s)/g_{p-p,i}(\gamma s)$ where $\gamma p$ is the pump wavelength, and $\gamma s$ is a representative signal wavelength. However, the upper limit will never be reached in a well-designed EDFA, and the lower limit may never be reached in practice. A design that uses the practical limits rather than "hard" ones is likely to perform better. See FIG. 8 for gain swings and their weighted sum. In FIG. 8, curve a shows the total gain swing of al-free optical fiber, curve b shows the total gain swing of Ge-free optical fiber, curve c shows the weighted gain swing of Al-free optical fiber, curve d shows the weighted gain swing of Ge-free optical fiber, and curve e shows the sum of the weighted gain swings shown by the curves c and d.

In this manner, different types of EDFs are spliced together to make a hybrid EDF, thereby obtaining a wavelength region where gain changes are independent of the wavelength.

The design rule above ensures that the LI gain spectrum has the same shape when $n_{2,i}$ reach their maximum (practical) values as when they reach their lower one. However, as the operating conditions change, $n_{2,i}$ will change by different amounts in different types of EDFs. If the amplified spontaneous emission (ASE) can be neglected, we have that $$n_2^i(x,y,z) = \frac{\frac{I_p \sigma_{a,p}^i}{h\nu_p} + \frac{I_s \sigma_{a,s}^i}{h\nu_s}}{\frac{1}{\tau_{sp}^i} + I_p \left[ \sigma_{a,p}^i + \frac{\sigma_{e,p}^i}{h\nu_p} + \frac{I_s(\sigma_{a,s}^i + \sigma_{e,s}^i)}{h\nu_s} \right]} \quad (4)$$

Figure 9A:
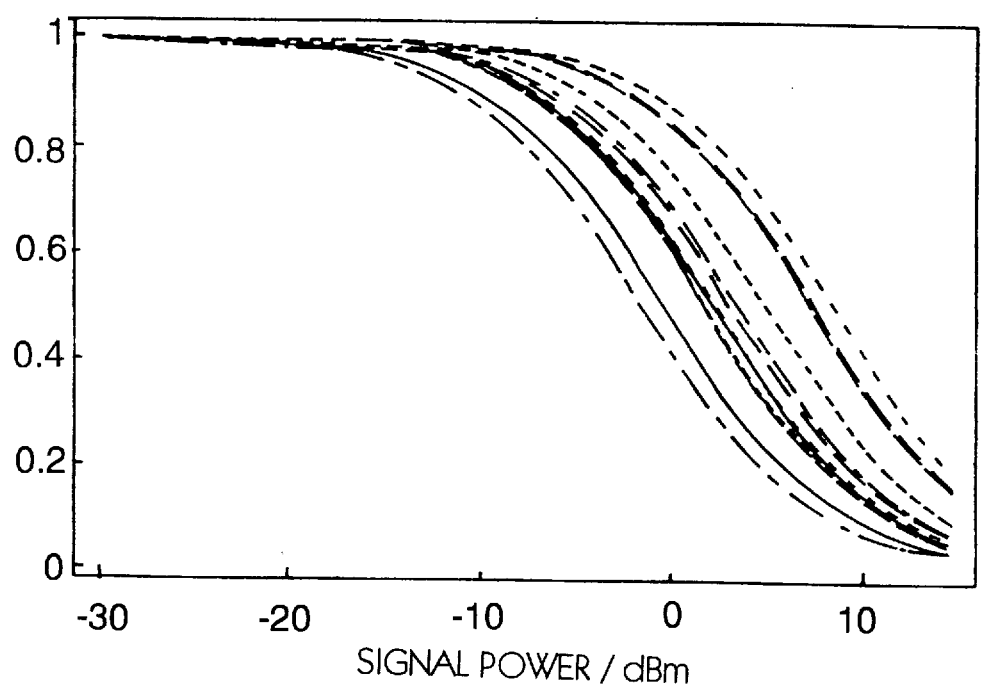
FIG. 9A is a graph for illustrating how pump wavelength influences gain compression, at a signal wavelength of 1532 nm, differently in EDFs of different composition; the difference in relative gain compression (actually, the gain relative to small signal gain) between two different types of EDFs is shown vs input signal power for three different pump wavelengths.
Figure 9B:
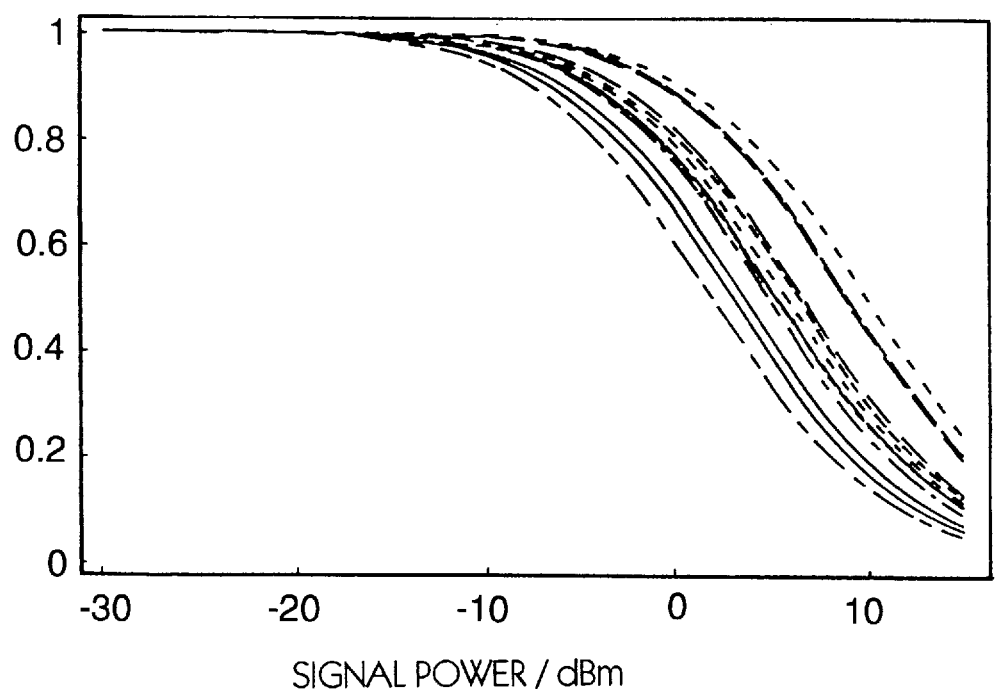
FIG. 9B is a graph for illustrating how pump wavelength influences gain compression, at a signal wavelength of 1550 nm, differently in EDFs of different composition; the difference in relative gain compression (actually, the gain relative to small signal gain ) between two different types of EDFs is shown vs input signal power for three different pump wavelengths.

($n_2^i$, is then obtained as a weighted average over $n_2^i(x, y, z)$.) A similar expression holds if ASE cannot be neglected. In equation (4), I is the intensity of the signal (subscript s) and pump (subscript p) inside the gain medium, $\sigma_{a,p}^i$, $\sigma_{a,p}^i$, $\sigma_{e,p}^i$, and $\sigma_{a,s}^i$ are the cross-sections for stimulated emission of the pump, absorption of the pump, stimulated emission of the signal, and absorption of the signal, respectively, in EDF type i, v is the optical frequency, $\tau_{sp}^i$ is the lifetime for spontaneous emission in EDF type i, and h is Planck's constant. Assume now that there are only two types of EDFs, A and B. For the change in $n_{2,A}$ (for EDF type A) to always equal that in $n_{2,B}$ (for EDF type B), the proportions of all the cross-sections as well as the lifetime for spontaneous emission must be the same between the two types of EDFs. (Experimentally, saturation characteristics of a very short EDF must be equal for all possible pump powers, for the two types. This is more accurate than the theoretical description attempted here, since among other things it takes into account the differences in overlaps in different EDFs at different wavelengths). In practice, this is not likely to be the case. However, by tuning the pump wavelength, the difference of the saturation characteristics of the (at least) two different types of EDFs can be minimized, as shown in FIGS. 9A and 9B. Here, FIGS. 9A and 9B show the difference in relative gain compression (i.e., the gain relative to the small-signal gain) between a silicate EDF and a ZBLAN EDF for three different pump wavelengths (965, 970, and 985 nm). FIG. 9A displays the difference for a signal wavelength γs of 1532 nm, and FIG. 9B for γs=1550 nm.

Still, even if the minimization was perfect, that would not be enough: The EDFs are by necessity located at different places; hence the power fluxes and intensities will be different. With this in mind, one is better off if the pump wavelength is optimized with respect to the finished, hybrid EDF than to minimize the differences in saturation characteristic of short pieces of the different types of EDFs. Especially since ASE, which is only significant in the finished EDFA, may be important for the details of the saturation.

The effect of different location of the different types of EDFs can be reduced in other ways, too. Ideally, if the hybrid EDF was made from very many pieces of very short EDFs, it would disappear. But that is impractical and can lead to large reflections and losses at the splice points. Still, the number of different pieces may well need to be larger than two in a non-reflecting EDFA, since otherwise, the saturation may only take place in one type of EDF, whereby only the gain swing spectrum of that EDF will be important, and no compensation by hybridization can result.

A reflective EDFA, as shown in FIG. 1B, represents a possibility for saturating the gain more evenly throughout the gain medium. Since the signal passes through the gain first in one direction and then in the other direction, and is normally growing all the time, regions with comparatively low signal power in the forward direction will experience a comparatively high signal power in the backward direction, and vice versa. Thus, the signal powers (forward plus backward) are more uniform along the gain medium (EDF), and the different types of EDFs can saturate more uniformly, especially if the pump wavelengths is carefully chosen, and the positions of the sections of EDF are optimized.

Also a backwardly pumped EDFA can increase the homogeneity of the gain compression in the different types of EDFs. In such an EDFA, the signal and pump powers are larger at the signal output end than at the input end, and the ratio between the two deviates much less than it does for a forwardly pumped EDFA (in which the pump is smaller at the signal output end than it is at the input end). Since the amount of gain compression is by and large determined by this ratio (cf, Eq. 4), the gain compression can be uniformly distributed throughout the EDFA.

The main point of the DGF EDFA is to make sure the gain shape is constant even when $n_2$ changes. This is possible if the gain swing is constant. In the hybrid case, one also has to make sure that the different $n_{2,i}$ change in the right proportions.

In contrast, if the degree of excitation $n_2$ is (almost) constant, at least in some part of the EDFA and for some range of operating conditions (sufficiently low signal input power), the gain shape of that section will always stay the same. This can be utilized for modifying the gain spectrum of the EDFA in a controlled manner. If a section of EDF where these conditions prevail are exchanged for another type of EDF, the total spectral response of the EDFA will change in an amount equal to differences in gain spectra between the exchanged EDFs under the operating conditions in question. The change depends on the exact details, such as chemical compositions, of the exchanged EDFs. The modification of the gain will be equivalent to that obtained with an ordinary attenuating filter, normally considered for modifications of the gain response (i.e. prior art), with the following advantageous exceptions:

1. Attenuating filters often attenuate the pump as well, especially if the filter is placed inside the EDF (midway filtering). This is undesirable.
2. Even if they do not attenuate the pump, they will attenuate the signal. If the desired modification of the gain spectrum can be obtained without signal attenuation, this will be advantageous. That would be possible with the currently proposed "filtering EDF".
3. If the attenuating filter is placed at or near the input of the EDFA, the noise figure of the EDFA will be degraded. If, on the other hand, it is placed near the output, the signal output power is decreased. In both cases, the small signal gain is also reduced. All of these degradations will severely affect the amplifier performance, unless they can be kept sufficiently small.

Note that even though it has been stated that a (piece of) one type EDF is exchanged for another type, this is only in order to explain the idea. In reality only the final EDFA is important. The fact that in order to arrive at the final EDFA design, one piece of EDFA may or may not, in reality or conceptually, have been exchanged for another one, is irrelevant.

As shown in FIGS. 10A and 10B, a "filtering EDF" 4 would typically be placed in the initial part of an EDFA with a co-propagating pump, since there, the signal can be weak and the pump strong. Backward ASE may have to be controlled, though, since it can affect $n_2$ in the "filtering EDF" section.

A "filtering EDF" can work especially well for a reflective EDFA with circulator shown in FIG. 10B, since for such an EDFA, it at the same time solves the problem with the possibly high noise figure resulting from the loss of the circulator. For such an EDFA, the "filtering EDF" 4 needs to be placed before the input to the circulator 2 of the reflective EDFA, as shown in FIG. 10B.

Figure 11A:
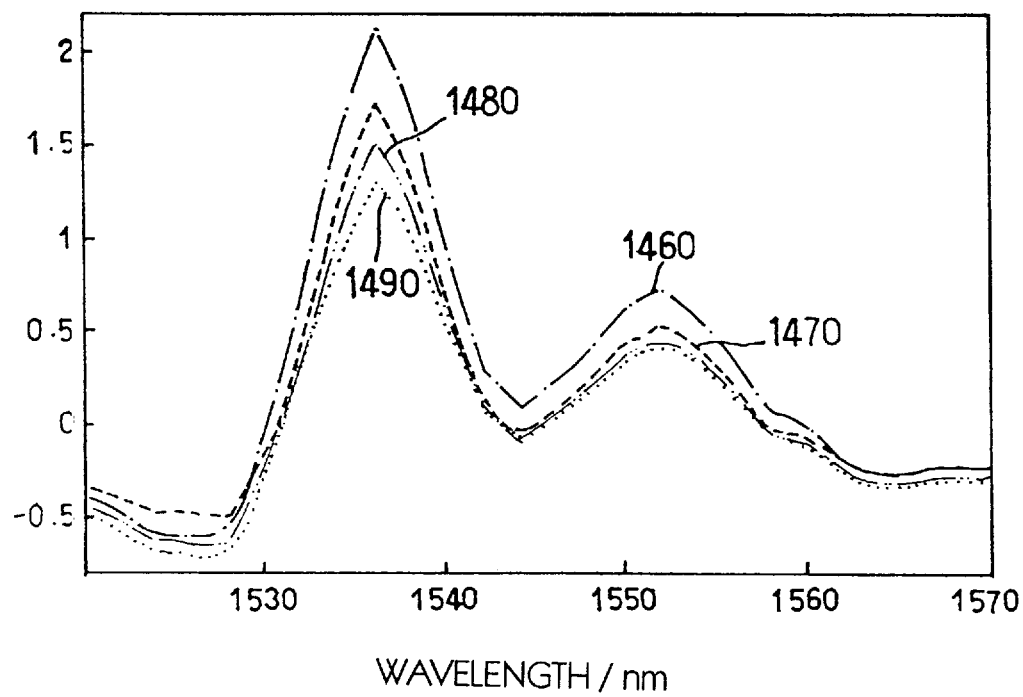
FIGS. 11A and 11B are graphs for illustrating how filtering can be controlled by the pump wavelength: the graphs show examples of how the gain spectrum would be modified if one type of EDF were exchanged for another type, for different pump wavelengths.
Figure 11B:
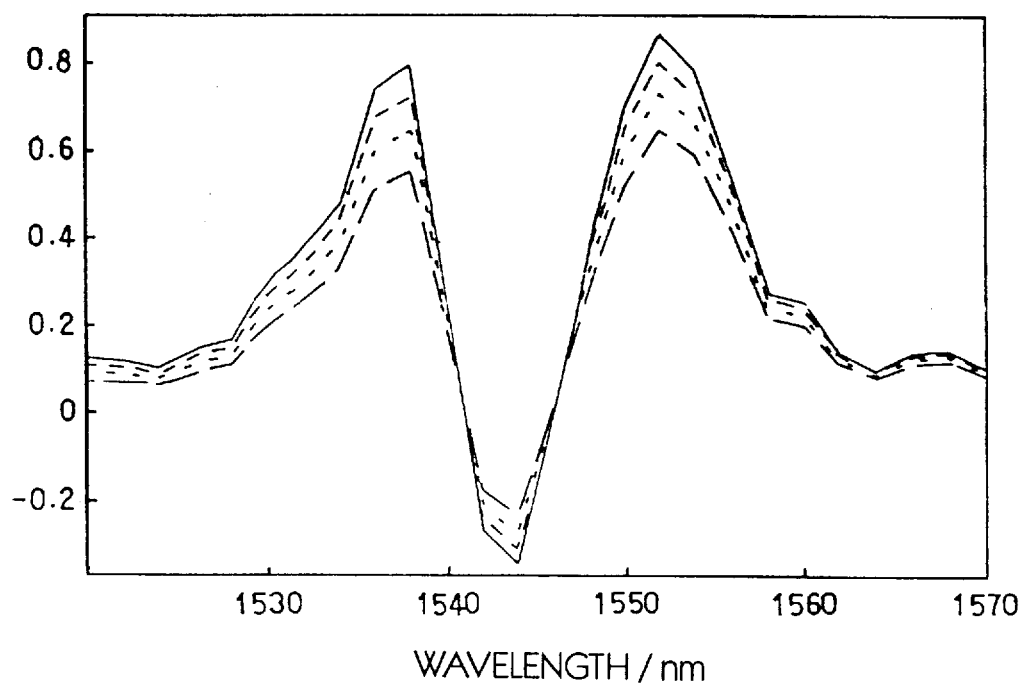

The gain spectrum of the "filtering EDF" and the replaced section of EDF, and thus the resulting filtering, depends on the degree of excitation in the exchanged EDFs. At the same time, the degree of excitation needs to be constant. This is automatically achieved if the pumping is strong and the signal weak, if also the ASE is weak. In the case of intra-band pumping of the EDF, using a pump around 1480 nm, $n_2$ will depend on the pump wavelength. This can be utilized for further controlling the effect of the "filtering EDF". FIGs. 11A and 11B are graphs showing the effect of the filtering for different pump wavelengths $\gamma p = 1460, 1470, 1480$ and $1490$ nm. FIG. 11A shows the change of the gain spectrum ("the filtering effect") that results if a germanium free aluminosilicate EDF would be used instead of an equivalent length of an aluminum free germanosilicate EDF. FIG. 11B shows the change that results if a phosphorous-codoped alumino-germanosilicate EDF is exchanged for a phosphorus and aluminum free germanosilicate EDF.

As described above, a preferred embodiment of DGF EDFA according to the present invention adopts a homogeneous gain medium having a constant gain swing over some wavelength range and consisting of one type of EDF (especially low $Al^{3+}$-content alumino-germanosilicate glass EDF), thereby obtaining a new EDFA having a gain spectral shape independent of the operating gain. Also, at least two different types of EDFs with different shapes of the gain swing may be spliced together to make a hybrid EDFA, thereby effectively cancelling the changes in the shape of gain spectra in the different EDFs and creating a flat gain swing independent of operating conditions. Also, the pump wavelength is carefully adjusted to obtain additional advantages. By inserting a linear filter, providing a spectrally dependent attenuation, before, after, or inside the gain medium, or using a specially selected EDF in a region of the EDFA where the inversion is independent of the signal power and wavelength, the shape of the gain spectrum can be made wavelength-independent (flat), thereby obtaining dynamic gain flatness (DGF). Hence, as described above, a homogeneous or hybrid gain medium with a wavelength-independent gain swing results in a constant shape of LI gain spectrum, independent of the input signal power operating gain, and population inversion. Either a special filter or a further modification of the design of the gain medium allows the gain spectrum to be wavelength-independent, so that DGF results. A constant spectral shape eliminates LI gain tilt variations in EDFAs for WDM and e.g., analog AM CATV, and DGF eliminates LI gain tilt.

The invention may be applied to optical amplifiers other than EDFA. Alternative embodiments of the invention may be applied to erbium doped planar amplifiers (EDPA) and other types of optical amplifiers.

All of the features disclosed in this specification including the accompanying claims, abstract and drawings may be combined in any combination, except combinations where at least some of such features and/or steps are mutually exclusive.

Each feature disclosed in this specification including the accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification and recited in the accompanying claims, or to any novel one, or any novel combination, so claimed.

What is claimed is:

1. An optical amplifier comprising:
   an input means;
   an output means; and
   a gain medium, disposed between said input and output means and used for amplifying signals of at least two wavelengths, and having a gain characteristic arranged such that, when a gain thereof changes at one wavelength, the gain thereof at another wavelength will change by substantially the same amount and such that the gain shape is independent of the operating gain.

2. An optical amplifier comprising:
   an input means;
   an output means; and
   a gain medium, disposed between said input and output means, and having a gain characteristic arranged such that, when the gain thereof changes at one wavelength, the gain thereof will change by substantially the same amount at all wavelengths in a continuous wavelength range and such that the gain shape is independent of the operating gain.

3. An optical amplifier comprising:
   an input means;
   an output means; and
   a gain medium, disposed between said input and output means, and having a gain characteristic arranged such that, when the gain thereof changes at one wavelength, the gain thereof will change by substantially the same amount at each of a plurality of discrete wavelengths in a wavelength range and such that the gain difference between any two of said plurality of wavelengths is independent of the operating gain.

4. An optical amplifier according to claim 2, wherein said gain medium comprises a substantially homogeneously broadened gain medium.

5. An optical amplifier according to claim 3, wherein said gain medium comprises a substantially homogeneously broadened gain medium.

6. An optical amplifier according to claim 4, wherein said gain medium comprises an optical fiber.

7. An optical amplifier according to claim 5, wherein said gain medium comprises an optical fiber.

8. An optical amplifier according to claim 6, wherein said optical fiber comprises an erbium doped fiber.

9. An optical amplifier according to claim 7, wherein said optical fiber comprises an erbium doped fiber.

10. An optical amplifier according to claim 8, wherein said optical fiber comprises an erbium doped alumino-germanosilicate fiber containing up to 10% aluminum.

11. An optical amplifier according to claim 9, wherein said optical fiber comprises an erbium doped alumino-germanosilicate fiber containing up to 10% aluminum.

12. An optical amplifier according to claim 10, wherein said aluminum content of said fiber is about 1%.

13. An optical amplifier according to claim 11, wherein said aluminum content of said fiber is about 1%.

14. An optical amplifier according to claim 6, wherein said gain characteristic of said medium is arranged by modifying a transverse disposition of said gain medium.

15. An optical amplifier according to claim 7, wherein said gain characteristic of said medium is arranged by modifying a transverse disposition of said gain medium.

16. An optical amplifier according to claim 8, wherein said gain characteristic of said medium is arranged by modifying a transverse disposition of the said gain medium.

17. An optical amplifier according to claim 9, wherein said gain characteristic of said medium is arranged by modifying a transverse disposition of the said gain medium.

18. An optical amplifier according to claim 14, wherein said gain medium comprises a hybrid gain medium comprising pieces of at least two different gain media, said at least two different gain media having lengths and positions adjusted to arrange said gain characteristic.

19. An optical amplifier according to claim 15, wherein said gain medium comprises a hybrid gain medium comprising pieces of at least two different gain media, said at least two different gain media having lengths and positions adjusted to arrange said gain characteristic.

20. An optical amplifier according to claim 16, wherein said gain medium comprises a hybrid gain medium comprising pieces of at least two different gain media, said at least two different gain media having lengths and positions adjusted to arrange said gain characteristic.

21. An optical amplifier according to claim 17, wherein said gain medium comprises a hybrid gain medium comprising pieces of at least two different gain media, said at least two different gain media having lengths and positions adjusted to arrange said gain characteristic.

22. An optical amplifier according to claim 18, further comprising a pump whose wavelength is selected to minimize any dependence of a locked inversion gain shape of said medium on a gain level in a predetermined wavelength range.

23. An optical amplifier according to claim 19, further comprising a pump whose wavelength is selected to minimize any dependence of a locked inversion gain shape of said medium on a gain level in a predetermined wavelength range.

24. An optical amplifier according to claim 20, further comprising a pump whose wavelength is selected to minimize any dependence of a locked inversion gain shape of said medium on a gain level in a predetermined wavelength range.

25. An optical amplifier according to claim 21, further comprising a pump whose wavelength is selected to minimize any dependence of a locked inversion gain shape of said medium on a gain level in a predetermined wavelength range.

26. An optical fiber amplifier according to claim 18, further comprising a reflecting mirror and optical branch-off means disposed such that a light signal passes twice through said gain medium before and after reflection by said mirror, thereby enhancing uniformity of signal-induced gain compression, a reflected light signal being branched off and output.

27. An optical fiber amplifier according to claim 19, further comprising a reflecting mirror and optical branch-off means disposed such that a light signal passes twice through said gain medium before and after reflection by said mirror, thereby enhancing uniformity of signal-induced gain compression, a reflected light signal being branched off and output.

28. An optical fiber amplifier according to claim 20, further comprising a reflecting mirror and optical branch-off means disposed such that a light signal passes twice through said gain medium before and after reflection by said mirror, thereby enhancing uniformity of signal-induced gain compression, a reflected light signal being branched off and output.

29. An optical fiber amplifier according to claim 21, further comprising a reflecting mirror and optical branch-off means disposed such that a light signal passes twice through said gain medium before and after reflection by said mirror, thereby enhancing uniformity of signal-induced gain compression, a reflected light signal being branched off and output.

30. An optical fiber amplifier according to claim 22, further comprising a reflecting mirror and optical branch-off means disposed such that a light signal passes twice through said gain medium before and after reflection by said mirror, thereby enhancing uniformity of signal-induced gain compression, a reflected light signal being branched off and output.

31. An optical fiber amplifier according to claim 23, further comprising a reflecting mirror and optical branch-off means disposed such that a light signal passes twice through said gain medium before and after reflection by said mirror, thereby enhancing uniformity of signal-induced gain compression, a reflected light signal being branched off and output.

32. An optical fiber amplifier according to claim 24, further comprising a reflecting mirror and optical branch-off means disposed such that a light signal passes twice through said gain medium before and after reflection by said mirror, thereby enhancing uniformity of signal-induced gain compression, a reflected light signal being branched off and output.

33. An optical fiber amplifier according to claim 25, further comprising a reflecting mirror and optical branch-off means disposed such that a light signal passes twice through said gain medium before and after reflection by said mirror, thereby enhancing uniformity of signal-induced gain compression, a reflected light signal being branched off and output.

34. An optical amplifier according to claim 30, further comprising a filter for modifying a gain spectrum of said gain medium to achieve a substantially equal gain in said predetermined wavelengths.

35. An optical amplifier according to claim 31, further comprising a filter for modifying a gain spectrum of said gain medium to achieve a substantially equal gain in said predetermined wavelengths.

36. An optical amplifier according to claim 32, further comprising a filter for modifying a gain spectrum of said gain medium to achieve a substantially equal gain in said predetermined wavelengths.

37. An optical amplifier according to claim 33, further comprising a filter for modifying a gain spectrum of said gain medium to achieve a substantially equal gain in said predetermined wavelengths.

38. An optical amplifier according to claim 26, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

39. An optical amplifier according to claim 27, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

40. An optical amplifier according to claim 28, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

41. An optical amplifier according to claim 29, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

42. An optical amplifier according to claim 30, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

43. An optical amplifier according to claim 31, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

44. An optical amplifier according to claim 32, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

45. An optical amplifier according to claim 33, further comprising an additional piece of gain medium, wherein a desired modification of the spectrum is obtained in a predetermined wavelength band by said additional piece of gain medium with desired spectral characteristics disposed in one of either a part of the amplifier in which the gain does not saturate or, in a part of the amplifier in which the amount of gain saturation does not change, over a range of operating conditions for which the amplifier has been designed.

46. An optical amplifier according to claim 26, further comprising a pump, wherein filtering in said additional piece of gain medium is adjusted by changing a wavelength of said pump.

47. An optical amplifier according to claim 27, further comprising a pump, wherein filtering in said additional piece of gain medium is adjusted by changing a wavelength of said pump.

48. An optical amplifier according to claim 28, further comprising a pump, wherein filtering in said additional piece of gain medium is adjusted by changing a wavelength of said pump.

49. An optical amplifier according to claim 29, further comprising a pump, wherein filtering in said additional piece of gain medium is adjusted by changing a wavelength of said pump.

50. An optical amplifier according to claim 30, wherein filtering in said additional piece of gain medium is adjusted by changing said pump wavelength.

51. An optical amplifier according to claim 31, wherein filtering in said additional piece of gain medium is adjusted by changing said pump wavelength.

52. An optical amplifier according to claim 32, wherein filtering in said additional piece of gain medium is adjusted by changing said pump wavelength.

53. An optical amplifier according to claim 33, wherein filtering in said additional piece of gain medium is adjusted by changing said pump wavelength.

54. An optical transmission system including at least one optical link and at least one optical amplifier, said at least one optical amplifier comprising:
   an input means;
   an output means; and
   a gain medium, disposed between said input and output means, and having a gain characteristic arranged such that, if a gain thereof changes at one wavelength, the gain thereof at another wavelength will change by substantially the same amount and such that the gain shape is independent of the operating gain.

55. An optical transmission system according to claim 54, wherein the system has losses which change in a predicted wavelength-dependent manner over a time period, said gain characteristic of said gain medium being adapted to change in a predetermined wavelength-dependent manner over said time period to compensate for said changes in said losses, so that the wavelength dependence of a net gain of the system remains substantially independent of said loss changes.

56. An optical transmission system according to claim 54, said at least one optical amplifier comprising at least two optical amplifiers, the optical transmission system comprising at least one filter associated with said at least two optical amplifiers, said at least one filter being disposed in one of either one of said at least two optical amplifiers or being disposed between two of said at least two optical amplifiers.

57. An optical amplifier comprising:
   input means for receiving an input signal;
   a wavelength selective coupler and a pump laser, said coupler receiving an output of said input means and an output of said pump laser;

a first optical filter, a first erbium doped fiber amplifier, a second optical filter, a second erbium doped fiber amplifier and a third optical filter arranged one after another, said first optical filter receiving an output from said wavelength selective coupler; and output means for receiving an output from said third optical filter and for outputting an amplified signal;

said wavelength selective coupler, pump laser, first through third optical filters, and first and second erbium doped fiber amplifiers being selected to minimize any dependence of a locked inversion gain shape of said fiber amplifiers on a gain level in a predetermined wavelength range.

58. An optical amplifier according to claim 1, further comprising a filter for modifying a gain spectrum of said gain medium to achieve a substantially equal gain in said predetermined wavelengths.

59. An optical amplifier according to claim 2, further comprising a filter for modifying a gain spectrum of said gain medium to achieve a substantially equal gain in said predetermined wavelengths.

60. An optical amplifier according to claim 3, further comprising a filter for modifying a gain spectrum of said gain medium to achieve a substantially equal gain in said predetermined wavelengths.

61. An optical amplifier according to claim 4, further comprising a filter for modifying a gain spectrum of said gain medium to achieve a substantially equal gain in said predetermined wavelengths.

62. An optical amplifier according to claim 5, further comprising a filter for modifying a gain spectrum of said gain medium to achieve a substantially equal gain in said predetermined wavelengths.

63. An optical amplifier according to claim 6, further comprising a filter for modifying a gain spectrum of said gain medium to achieve a substantially equal gain in said predetermined wavelengths.

64. An optical amplifier according to claim 7, further comprising a filter for modifying a gain spectrum of said gain medium to achieve a substantially equal gain in said predetermined wavelengths.

65. An optical amplifier according to claim 8, further comprising a filter for modifying a gain spectrum of said gain medium to achieve a substantially equal gain in said predetermined wavelengths.

66. An optical amplifier according to claim 9, further comprising a filter for modifying a gain spectrum of said gain medium to achieve a substantially equal gain in said predetermined wavelengths.

67. An optical amplifier according to claim 10, further comprising a filter for modifying a gain spectrum of said gain medium to achieve a substantially equal gain in said predetermined wavelengths.

68. An optical amplifier according to claim 11, further comprising a filter for modifying a gain spectrum of said gain medium to achieve a substantially equal gain in said predetermined wavelengths.

69. An optical amplifier according to claim 12, further comprising a filter for modifying a gain spectrum of said gain medium to achieve a substantially equal gain in said predetermined wavelengths.

70. An optical amplifier according to claim 13, further comprising a filter for modifying a gain spectrum of said gain medium to achieve a substantially equal gain in said predetermined wavelengths.

71. An optical amplifier according to claim 14, further comprising a filter for modifying a gain spectrum of said gain medium to achieve a substantially equal gain in said predetermined wavelengths.

72. An optical amplifier according to claim 15, further comprising a filter for modifying a gain spectrum of said gain medium to achieve a substantially equal gain in said predetermined wavelengths.

73. An optical amplifier according to claim 16, further comprising a filter for modifying a gain spectrum of said gain medium to achieve a substantially equal gain in said predetermined wavelengths.

74. An optical amplifier according to claim 17, further comprising a filter for modifying a gain spectrum of said gain medium to achieve a substantially equal gain in said predetermined wavelengths.

75. An optical amplifier according to claim 18, further comprising a filter for modifying a gain spectrum of said gain medium to achieve a substantially equal gain in said predetermined wavelengths.

76. An optical amplifier according to claim 19, further comprising a filter for modifying a gain spectrum of said gain medium to achieve a substantially equal gain in said predetermined wavelengths.

77. An optical amplifier according to claim 20, further comprising a filter for modifying a gain spectrum of said gain medium to achieve a substantially equal gain in said predetermined wavelengths.

78. An optical amplifier according to claim 21, further comprising a filter for modifying a gain spectrum of said gain medium to achieve a substantially equal gain in said predetermined wavelengths.

79. An optical amplifier according to claim 22, further comprising a filter for modifying a gain spectrum of said gain medium to achieve a substantially equal gain in said predetermined wavelengths.

80. An optical amplifier according to claim 23, further comprising a filter for modifying a gain spectrum of said gain medium to achieve a substantially equal gain in said predetermined wavelengths.

81. An optical amplifier according to claim 24, further comprising a filter for modifying a gain spectrum of said gain medium to achieve a substantially equal gain in said predetermined wavelengths.

82. An optical amplifier according to claim 25, further comprising a filter for modifying a gain spectrum of said gain medium to achieve a substantially equal gain in said predetermined wavelengths.

83. An optical amplifier according to claim 26, further comprising a filter for modifying a gain spectrum of said gain medium to achieve a substantially equal gain in said predetermined wavelengths.

84. An optical amplifier according to claim 27, further comprising a filter for modifying a gain spectrum of said gain medium to achieve a substantially equal gain in said predetermined wavelengths.

85. An optical amplifier according to claim 28, further comprising a filter for modifying a gain spectrum of said gain medium to achieve a substantially equal gain in said predetermined wavelengths.

86. An optical amplifier according to claim 29, further comprising a filter for modifying a gain spectrum of said gain medium to achieve a substantially equal gain in said predetermined wavelengths.

87. An optical amplifier according to claim 30, further comprising a filter for modifying a gain spectrum of said gain medium to achieve a substantially equal gain in said predetermined wavelengths.

88. An optical amplifier according to claim 31, further comprising a filter for modifying a gain spectrum of said gain medium to achieve a substantially equal gain in said predetermined wavelengths.

89. An optical amplifier according to claim 32, further comprising a filter for modifying a gain spectrum of said gain medium to achieve a substantially equal gain in said predetermined wavelengths.

90. An optical amplifier according to claim 33, further comprising a filter for modifying a gain spectrum of said gain medium to achieve a substantially equal gain in said predetermined wavelengths.

91. An optical transmission system according to claim 54, further comprising a filter for modifying a gain spectrum of said gain medium to achieve a substantially equal gain in said predetermined wavelengths.

* * * * *